Figure 3:
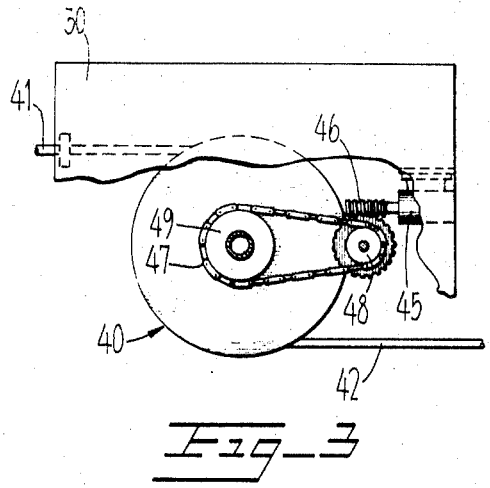
Figure 4:
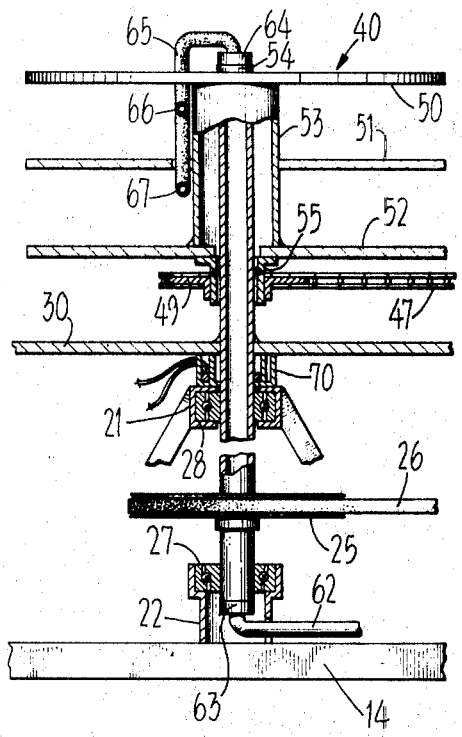
Figure 5:
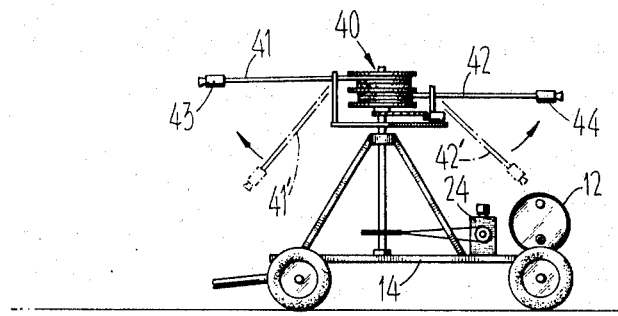
Figure 6:
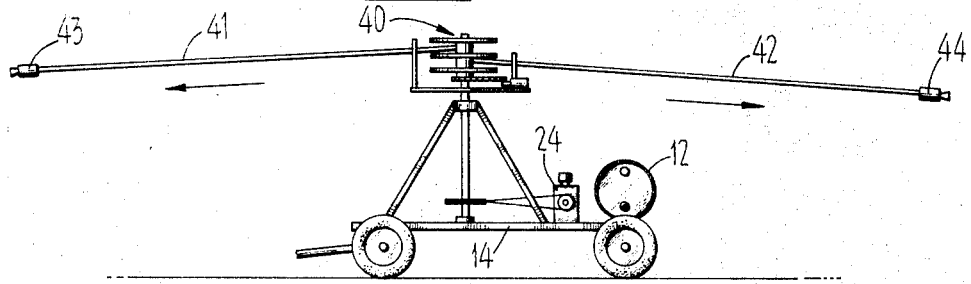

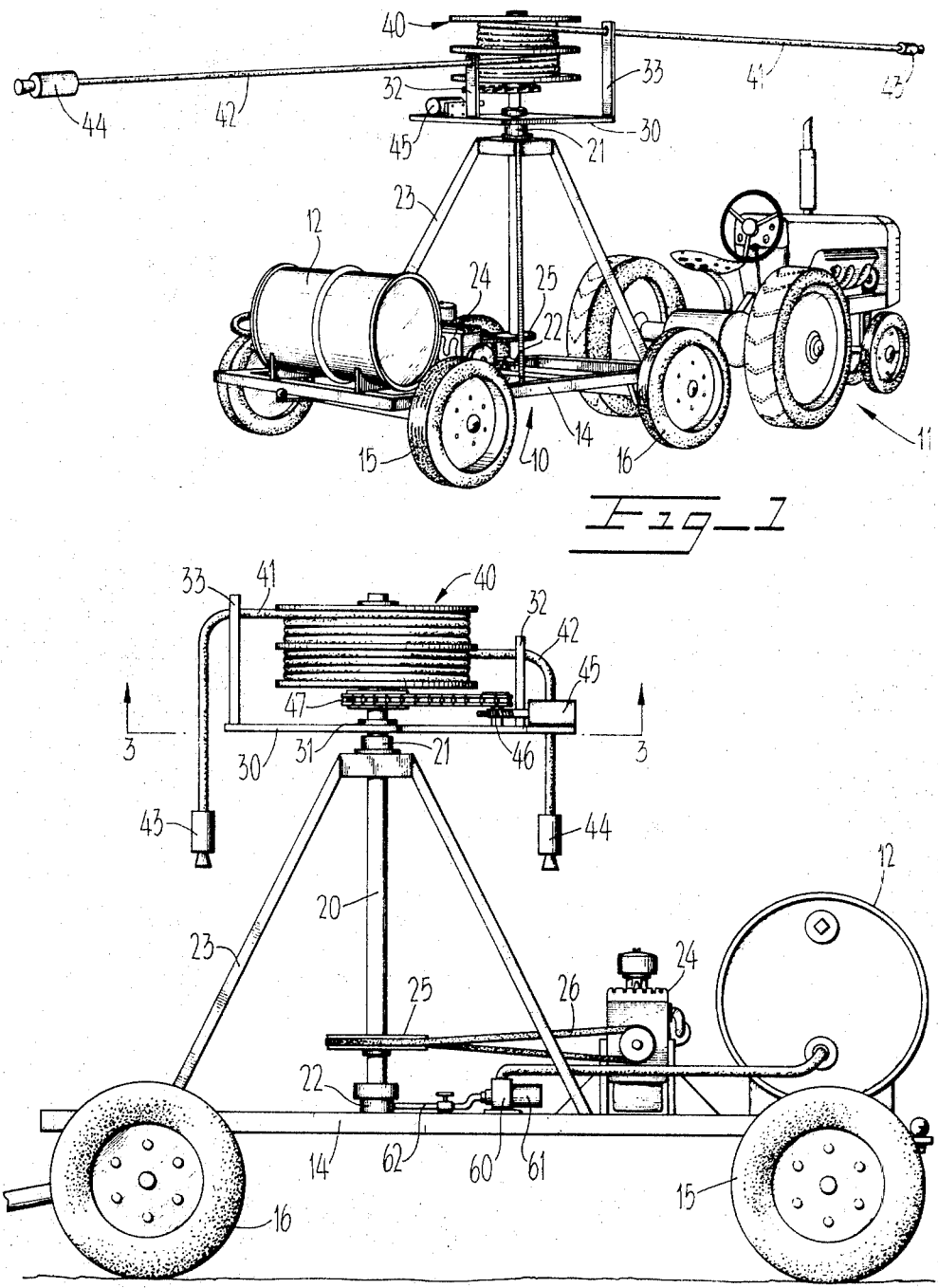

Oct. 14, 1969   G. H. STRONG   3,472,456

AGRICULTURE SPRAYING APPARATUS FOR LARGE AREA

Filed Feb. 1, 1968   2 Sheets-Sheet 2

INVENTOR.
Gardner H. Strong
BY
Gardner & Zimmerman
ATTORNEYS rotation therewith and engaging said hose in a driving relationship to rotate the same when said column is rotated, and a source of pressurized liquid to be sprayed, communicably connected to said hose.

2. The spraying apparatus of calim 1 wherein reel drive means is operably connected to said reel for rotating same independently of rotation of said column to extend and retract said hose.

3. The spraying apparatus of claim 2 wherein said reel drive means is coupled to said hose reel by a non-slip coupling means.

4. The spraying apparatus of claim 3 wherein said reel drive means is mounted for rotation with said column and includes brake means for selectively preventing said hose reel from rotating independently relative to said column.

5. The spraying apparatus of claim 1 wherein at least two hoses are wound upon said hose reel in opposite directions and wherein said hose drive means engages said hoses at opposite sides of said hose reel to rotate said hoses in substantially diametrically opposed positions.

6. The spraying apparatus of claim 5 wherein a drive platform is mounted on said column for rotation therewith, said hose drive means being posts mounted on opposite sides of said drive platform, each of which engages a corresponding one of said hoses.

7. The spraying apparatus of claim 6 wherein reel drive means is mounted on said platform for rotation therewith and operably coupled to said reel for selectively rotating same independently of rotation of said column to extend and retract said hoses, said reel drive means being coupled to said hose reel by a nonslip coupling means and including brake means for selectively preventing said hose reel from rotating independently to said column.

References Cited

UNITED STATES PATENTS 3,150,830    9/1964    Griffith _____ 239—198

FOREIGN PATENTS 783,436    9/1957    Great Britain.

EVERETT W. KIRBY, Primary Examiner

MICHAEL Y. MAR, Assistant Examiner

U.S. Cl. X.R.

239—198, 229

Oct. 14, 1969  T. McAVOY  3,472,457
AEROSOL TIP AND INSERT ASSEMBLY
Filed Jan. 29, 1968
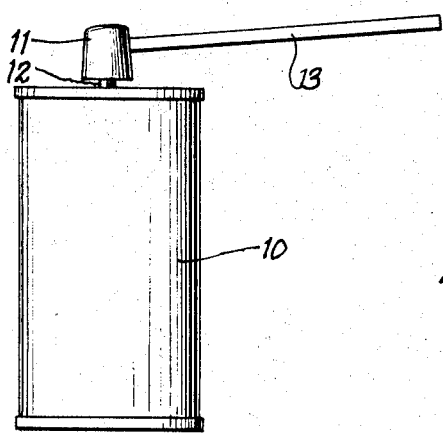
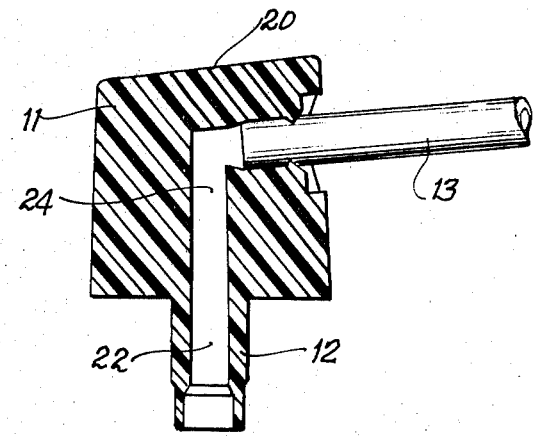
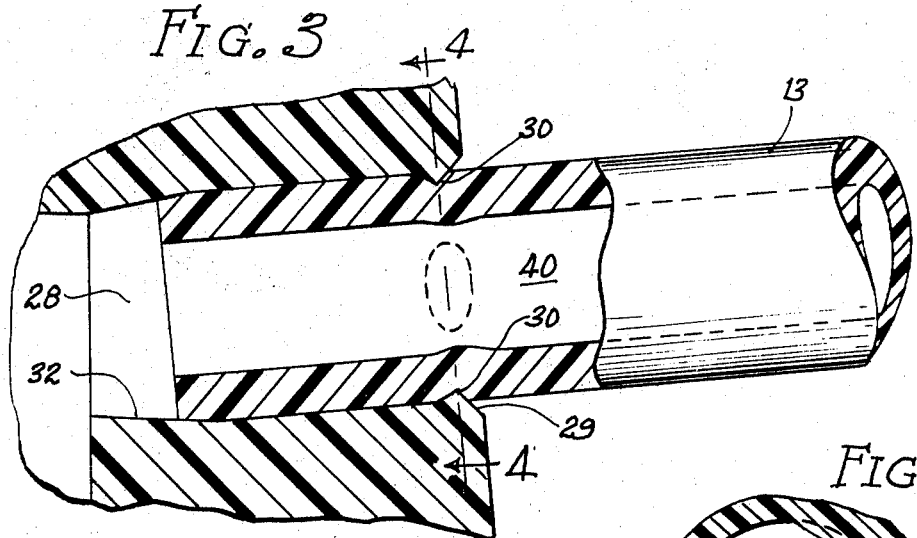
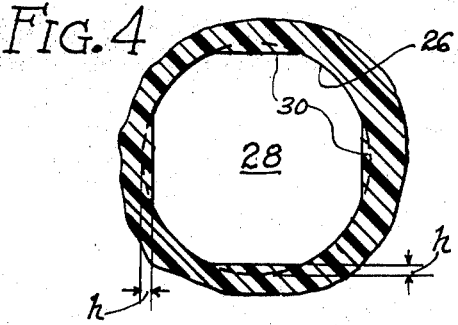
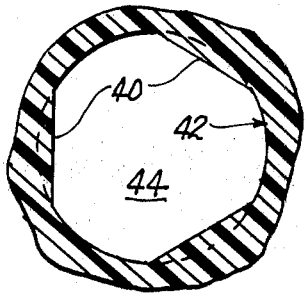
INVENTOR
Thomas McAvoy
by Dressler, Goldsmith, Clement
and Gordon
Att'ys